United States Patent [19]

Dassero

[11] Patent Number: 5,305,039

[45] Date of Patent: Apr. 19, 1994

[54] PHOTOGRAPHIC CAMERA WITH LIGHT SEAL/LATCH DEVICE FOR LOADING DOOR

[75] Inventor: William F. Dassero, Rochester, N.Y.

[73] Assignee: Eastman Kodak Company, Rochester, N.Y.

[21] Appl. No.: 46,061

[22] Filed: Apr. 12, 1993

[51] Int. Cl.$^5$ .................. G03B 17/02; G03B 17/26
[52] U.S. Cl. .................. 354/288; 354/201; 354/281
[58] Field of Search .................. 354/202, 281, 288

[56] References Cited

U.S. PATENT DOCUMENTS

| | | | |
|---|---|---|---|
| 3,249,032 | 5/1966 | Wareham | 354/288 |
| 4,214,830 | 7/1980 | Schroder | 354/202 |
| 4,324,476 | 4/1982 | Seely | 354/288 |
| 4,332,453 | 6/1982 | Seely et al. | 354/288 |
| 4,469,421 | 9/1984 | Kamata | 354/212 |
| 4,697,903 | 10/1987 | Koda et al. | 354/288 |
| 4,758,855 | 7/1988 | Tamamura et al. | 354/288 |
| 4,887,114 | 12/1989 | Yamamoto et al. | 354/288 |

Primary Examiner—Michael L. Gellner
Assistant Examiner—Eddie C. Lee
Attorney, Agent, or Firm—Roger A. Fields

[57] ABSTRACT

A photographic camera comprises a camera body, a cartridge receiving chamber located inside the camera body, a door connected to the camera body for closing and opening movement to cover and uncover the chamber, and latching means connected to the camera body for locking and unlocking movement to lock the door closed and to unlock the door. According to the invention, actuating means connects the door and the latching means for initiating opening movement of the door in response to unlocking movement of the latching means and for initiating locking movement of the latching means in response to closing movement of the door. Preferably, the latching means includes a light sealing collar for the door which is shaped to partially surround the door when the door is locked closed to prevent ambient light from leaking under the door into the cartridge receiving chamber.

7 Claims, 5 Drawing Sheets

PHOTOGRAPHIC CAMERA WITH LIGHT SEAL/LATCH DEVICE FOR LOADING DOOR

BACKGROUND OF THE INVENTION

1. Field of the Invention

The invention relates generally to the field of photography and in particular to photographic cameras. More specifically, the invention relates to a light seal/latch device for the loading door of a photographic camera.

2. Description of the Prior Art

It is well known for a photographic camera to comprise a cartridge receiving chamber, a loading door supported for closing and opening movement to cover and uncover the chamber, and latching means supported for locking and unlocking movement to lock the door closed and to unlock the door. Typically, the latching means is manually actuated to unlock the door and then the door is manually opened.

Alternatively, U.S. Pat. No. 4,469,421, issued Sep. 4, 1984, discloses a photographic camera in which a bottom loading door is opened to uncover a cartridge receiving chamber. During opening movement, the loading door pivots a latching lever out of engagement with a rear door to permit the rear door to be opened. The latching lever then holds the loading door in an open position. When the rear door is closed, however, it pivots the latching lever out of engagement with the loading door to permit the loading door to be closed.

Problem to be Solved by the Invention

Prior art cameras often require separate manual unlocking of the latching means and manual opening of the loading door.

Alternative approaches, such as disclosed in U.S. Pat. No. 4,469,421, require a second door.

Also, it is sometimes a problem that ambient light may leak under the loading door into the cartridge receiving chamber.

SUMMARY OF THE INVENTION

According to the invention, a photographic camera comprising a camera body, a cartridge receiving chamber located inside the camera body, a door connected to the camera body for closing and opening movement to cover and uncover the chamber, and latching means connected to the camera body for locking and unlocking movement to lock the door closed and to unlock the door, is characterized in that:

actuating means connects the door and the latching means for initiating opening movement of the door in response to unlocking movement of the latching means and for initiating locking movement of the latching means in response to closing movement of the door.

Preferably, the latching means includes a light sealing collar for the door which is shaped to partially surround the door when the door is locked closed to prevent ambient light from leaking under the door into the cartridge receiving chamber.

DETAILED DESCRIPTION OF THE PREFERRED EMBODIMENT

The invention is disclosed as being embodied in a 35 mm still-picture camera. Because such a photographic camera is well known, this description is directed in particular to camera elements forming part of or cooperating directly with the preferred embodiment. It is to be understood, however, that camera elements not specifically shown or described may take various forms known to a person of ordinary skill in the art.

Figure 1:
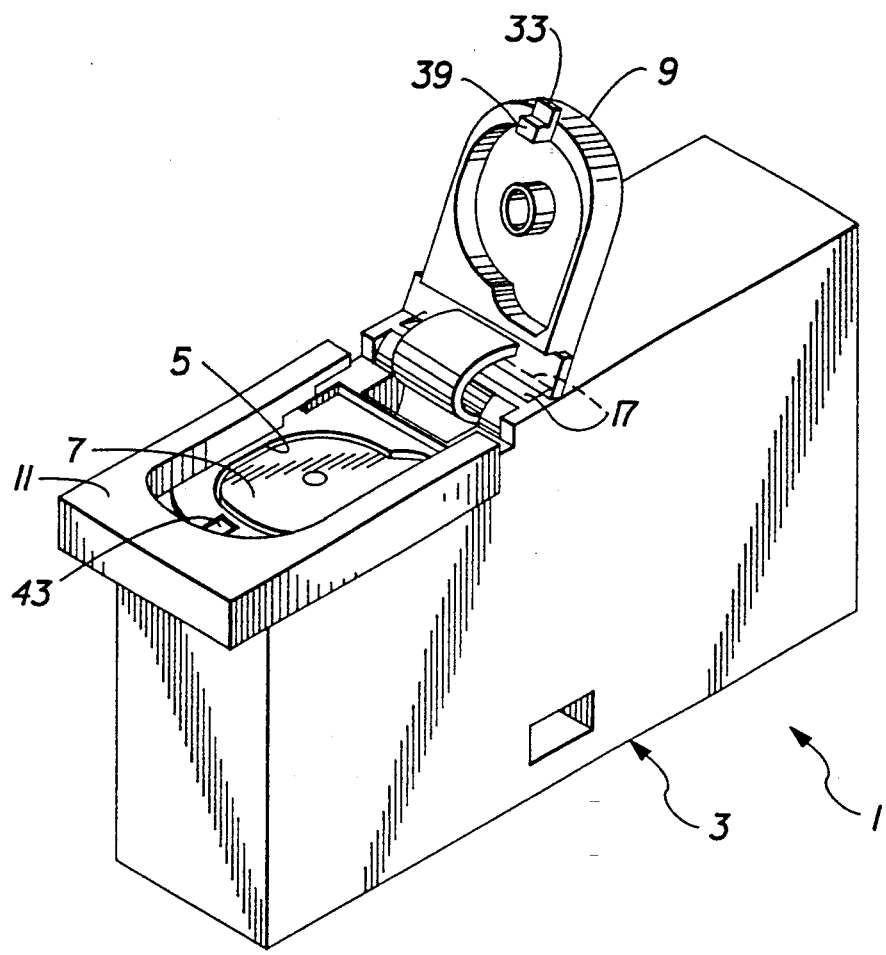
FIG. 1 is a bottom rear perspective view of a photographic camera according to a preferred embodiment of the invention, showing a loading door opened to uncover a cartridge receiving chamber and a light sealing collar retracted from the door to permit the door to be opened.

Referring now to the drawings, FIG. 1 shows a 35 mm still-picture camera 1 comprising a camera body 3, a cartridge receiving chamber 5 for receiving a conventional 35 mm film cartridge 7 axially, i.e. endwise, a bottom loading door 9, and a light sealing collar 11.

Figure 3:
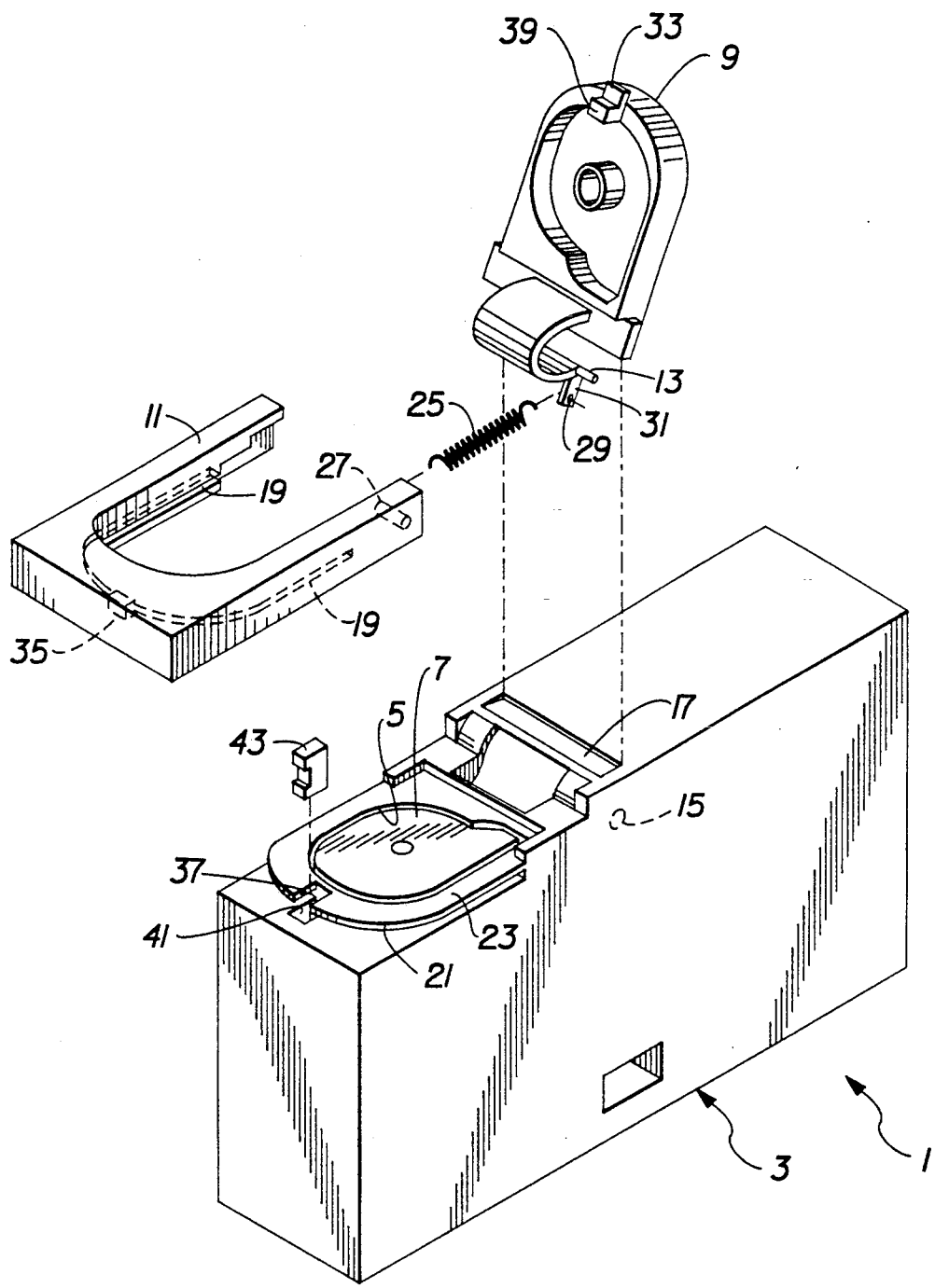
FIG. 3 is a view similar to FIG. 1, shown with the collar and the door removed to reveal otherwise hidden details.
Figure 5:
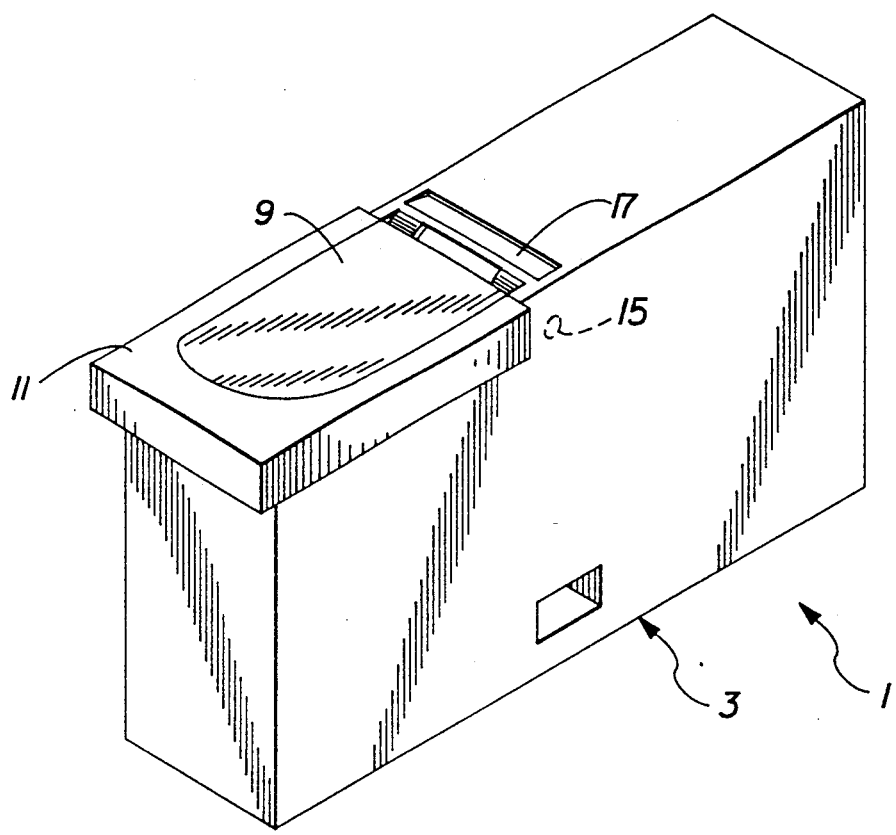
FIG. 5 is a view similar to FIG. 1, showing the door closed and the collar partially surrounding the door to lock the door closed and to prevent ambient light from leaking under the door into the cartridge receiving chamber.

As can be appreciated by looking at FIG. 3, the door 9 includes a pivot pin 13 with opposite ends located in respective cavities 15 formed in the inner sides of front and rear walls of the camera body 3. This arrangement supports the door 9 for pivotal closing movement to cover the cartridge receiving chamber 5 as shown in FIG. 5 and for pivotal opening movement to uncover the chamber as shown in FIG. 1. An opening 17 is cut in a bottom wall of the camera body 3 to provide a clearance space for the door 9 when the door is opened. See FIG. 3.

The light sealing collar 11 has an interior channel 19 which receives a rib 21 extending along the periphery of a platform 23 that surrounds the cartridge receiving chamber 5. See FIGS. 1-3. This arrangement supports the collar 11 for translational movement towards and away from the door 9 as shown in FIGS. 1 and 5. FIG. 5 depicts the collar 11 partially surrounding the door 9, when the door is closed, to prevent ambient light from leaking under the door into the chamber 5. FIG. 1 shows the collar 11 retracted from the door 9 and the door opened.

A helical tension spring 25 has one end connected to the collar 11 at an interior post 27 and another end connected to a hole 29 in a lug 31. The lug 31 projects from the door 9 at a location which is beneath the pivot pin 13 as viewed in FIG. 3, to be off-axis with respect to the pivot pin. This arrangement makes the spring 25 serve as torsional actuating means for initiating opening movement of the door 9 in response to retracting movement of the collar 11 from the door as shown in FIG. 1 and for initiating return movement of the collar to the door in response to closing movement of the door as shown in FIG. 5.

The door 9 includes a protruding latching member 33 that fits into an interior cavity 35 in the collar 11 when the door is closed and the collar is returned to the door. Receipt of the latching member 33 in the cavity 35 permits the two to act as engagable means to releasably lock the door closed. See FIGS. 2, 3, and 4.

A void 37 or gap is formed in the platform 23 in the region of the rib 21 to receive a plunger portion 39 of the latching member 33 to permit the door 9 to be lowered against the platform when the door is closed. See FIGS. 2, 3, and 4.

Figure 2:
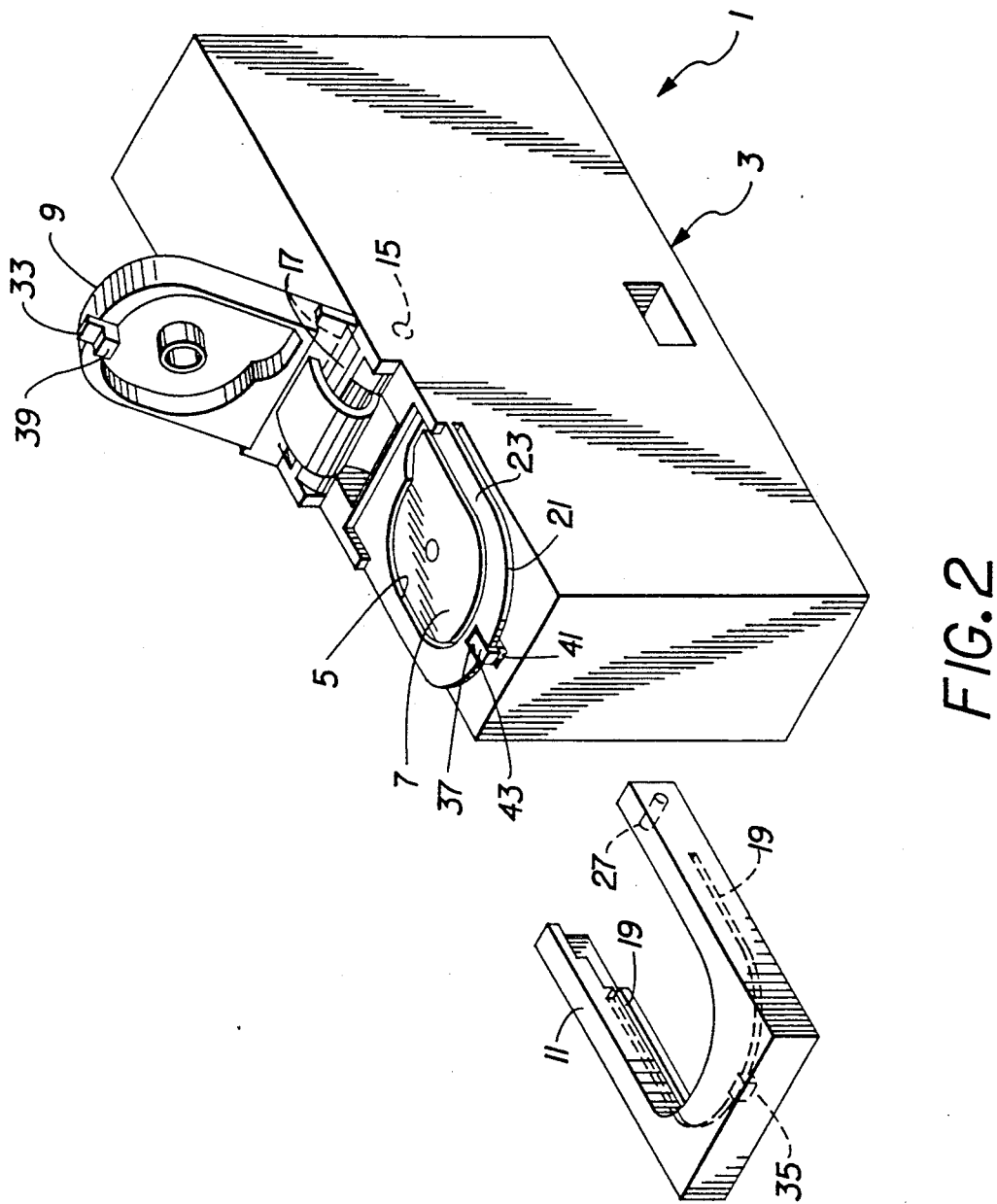
FIG. 2 is a view similar to FIG. 1, shown with the collar removed to reveal otherwise hidden details.
Figure 4:
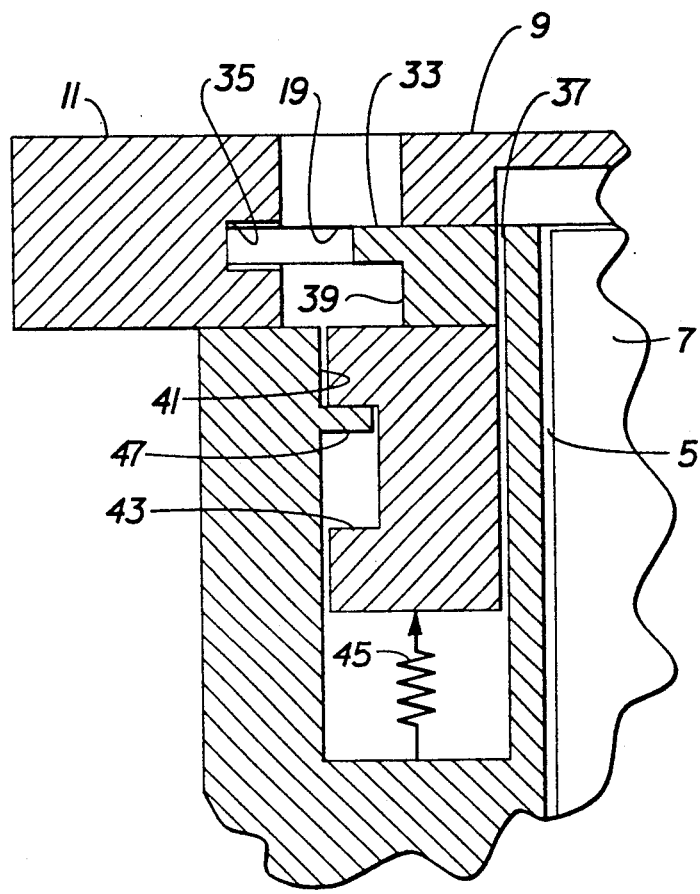
FIG. 4 is a sectional view of the door and the collar.

An interior well 41 is formed in the camera body 3 immediately beneath the void 37 as viewed in FIGS. 3 and 4 to house a blocking member 43. The blocking member 43 is held in the well 41 against the contrary urging of a helical compression spring 45 by the plunger portion 39 of the latching member 33 when the plunger portion is located in the void 37 because the door 9 is closed. As shown in FIGS. 1 and 2, opening the door 9 removes the plunger portion 39 from the void 37, permitting the spring 45 to move the blocking member 43 part way out of the well 41 into the void. The blocking member 43 is larger than the void 37, and therefore projects from the void to hold the collar 11 retracted somewhat from the platform 23 as shown in FIG. 1. A fixed stop 47, shown in FIG. 4, limits the extent to which the spring 45 can move the blocking member 43 out of the well 41.

Operation

Beginning with FIG. 1, when the light sealing collar 11 is retracted from the loading door 9 by manually sliding the collar along the camera body 3 to the left in FIG. 1, the interior cavity 35 in the collar is separated from the latching member 33 (which is then projecting from the void 37 in the platform 23 as shown in FIG. 4) of the door. Consequently, the door 9 via a torsion force of the spring 25 is pivoted open as shown in FIG. 1 to uncover the cartridge receiving chamber 5.

When the door 9 is pivoted open, the plunger portion 39 of the latching member 33 is removed from the void 37. The spring 45 then moves the blocking member 43 part way out of the well 41 into the void 37, permitting the blocking member to hold the collar 11 retracted somewhat from the platform 23 as shown in FIG. 1. Thus, the film cartridge 7 can be inserted endwise into the chamber 5.

The invention has been described with reference to a preferred embodiment. However, it will be appreciated that variations and modifications can be effected by one of ordinary skill in the art without departing from the scope of the invention.

Parts List for FIGS. 1-5

1. camera
3. camera body
5. cartridge receiving chamber
7. film cartridge
9. door
11. light sealing collar
13. pivot pin
15. cavities
17. opening
19. interior channel
21. rib
23. platform
25. spring
27. post
29. hole
31. lug
33. latching member
35. cavity
37. void
39. plunger portion
41. interior well
43. blocking member
45. spring
47 stop

I claim:

1. A photographic camera comprising a camera body, a cartridge receiving chamber located inside said camera body, a door connected to said camera body for closing and opening movement to cover and uncover said chamber, and latching means connected to said camera body for locking and unlocking movement to lock said door closed and to unlock the door, is characterized in that:
   actuating means connects said door and said latching means for initiating opening movement of the door in response to unlocking movement of the latching means and for initiating locking movement of the latching means in response to closing movement of the door.

2. A photographic camera as recited in claim 1, wherein said latching means includes a light sealing collar for said door which is shaped to partially surround the door when the door is locked closed to prevent ambient light from leaking under the door into said cartridge receiving chamber.

3. A photographic camera as recited in claim 2, wherein said door and said collar include mutually engagable means for engaging to lock the door closed.

4. A photographic camera as recited in claim 2, wherein said collar is supported to be retracted from said door to permit opening movement of the door and to return to the door to partially surround the door.

5. A photographic camera as recited in claim 4, wherein stop means for holding said collar retracted from said door is supported to be moved out of the way of the collar by the door during closing movement of the door to permit the collar to return to the door.

6. A photographic camera as recited in claim 1, wherein stop means for preventing locking movement of said latching means is supported to be moved out of the way of the latching means by said door during closing movement of the door to permit locking movement of the latching means.

7. A photographic camera as recited in claim 1, wherein said door is supported for pivotal movement to open and close, said latching means is supported for translational movement to lock and unlock said door, and said actuating means includes elastic means for pulling said door to pivot the door open in response to translational movement of said latching means to unlock the door and for pulling the latching means to lock the door in response to pivotal movement of the door to close the door.

* * * * *